United States Patent [19]
Levine

[11] Patent Number: 4,954,817
[45] Date of Patent: Sep. 4, 1990

[54] FINGER WORN GRAPHIC INTERFACE DEVICE

[76] Inventor: Neil A. Levine, 841 Oeste Dr., Davis, Calif. 95616

[21] Appl. No.: 189,185

[22] Filed: May 2, 1988

[51] Int. Cl.$^5$ .............................................. G09G 3/09
[52] U.S. Cl. .................................. 340/706; 340/709; 178/18
[58] Field of Search .................. 340/706, 707, 712; 178/18, 19; 273/148 B; 401/6; 341/20, 33, 34; 364/520

[56] References Cited

U.S. PATENT DOCUMENTS

| | | | |
|---|---|---|---|
| 3,625,083 | 12/1971 | Bose | 74/471 |
| 3,700,836 | 10/1972 | Rackson | 273/148 B |
| 3,846,580 | 9/1974 | Brenner | 178/19 |
| 3,904,821 | 9/1975 | Whetstone | 178/19 |
| 3,904,822 | 9/1975 | Kamm | 178/19 |
| 4,444,998 | 4/1984 | House | 178/19 |
| 4,494,105 | 1/1985 | House | 338/114 |
| 4,520,355 | 5/1985 | Mitch | 340/709 |
| 4,550,316 | 10/1985 | Whetstone | 340/710 |
| 4,564,079 | 1/1986 | Moore | 178/18 |
| 4,564,835 | 1/1986 | Dhawan | 340/710 |
| 4,565,999 | 1/1986 | King | 340/706 |
| 4,570,149 | 2/1986 | Thornburg | 338/114 |
| 4,587,378 | 5/1986 | Moore | 178/18 |
| 4,613,853 | 9/1986 | Hosogoe | 340/710 |
| 4,654,647 | 3/1987 | Wedam | 340/709 |
| 4,654,648 | 3/1987 | Herrington | 340/710 |
| 4,687,885 | 8/1987 | Talmage | 178/18 |
| 4,698,626 | 10/1987 | Sato | 340/710 |
| 4,722,625 | 2/1988 | O'Brien | 401/6 |
| 4,839,634 | 6/1989 | More et al. | 178/18 |
| 4,853,494 | 8/1989 | Suzuki | 178/18 |

OTHER PUBLICATIONS

Williams, Tom, "Input Technologies Extend the Scope of User Involvement" Computer Design, Mar. 1, 1988, pp. 41-52.
Naegele, Tobias, "Graphic Tablet Tries to Compete with Mouse" Electronics, Oct, 2, 1986, p. 44.
McGrath, Richard, "Fast, Tri-Axis Pointing" Computer Graphics World, Mar. 1988, pp. 145-146.
Murray, W. H., and Pappas, C. H., "Pick of the Litter" Byte, Jun. 1987, pp. 238-242.
Platshon, Mark, "Acoustic Touch Technology Adds a New Input Dimension" Computer Design, Mar. 15, 1988, pp. 89-93.
R. P. James–"Finger-Print Sensor"–IBM Technical Disclosure Bulletin–vol. 14, No. 11, Apr./1972–p. 3361.

*Primary Examiner*—Alvin E. Oberley
*Assistant Examiner*—M. Fatahiyar

[57] ABSTRACT

A miniaturized finger worn X-Y graphic interface device. A finger palette (20), a stylus ring (10) and an electronic module (32) exhibit benefits of both an X-Y degitizing tablet and a mouse without their inherent difficulties. A unique location and method facilitate use in an absolute or relative mode. When used in conjunction with a conventional keyboard, the computer-human interface becomes faster, more natural, efficient and intuitive.

19 Claims, 2 Drawing Sheets

FINGER WORN GRAPHIC INTERFACE DEVICE

BACKGROUND

1. Field of Invention

This invention relates to graphic interface devices, commonly called graphic or X-Y digitizing tablets, mice, track balls, light pens, joy sticks or knob boxes which allow graphic data to be input into computers, for example. Specifically, the invention relates to an improved, miniaturized, finger worn X-Y graphic interface device which can emulate a mouse.

2. Discussion of Prior Art

The following discussion will often refer to computers as an example of a device which requires or can benefit from my invention. It is not intended to imply that computers are the only devices which will work with this invention. For example, this invention could be used to control steering, acceleration and braking of a vehicle such as a wheelchair or for other purposes.

Heretofore, apart from a conventional keyboard, interfacing with a computer has been limited to devices which are hand operated and physically separated from the keyboard. These devices require that one's hand be physically moved from the main keyboard and that an interface implement be manipulated using one's entire arm, wrist or fingers.

Mouse type devices which are moved over a surface by hand motion are discussed in U.S. Pat. Nos. 4,550,316 (Whetstone, et al), 4,613,853 (Hosogoe, et al), 4,698,626 (Sato, et al) and 4,564,835 (Dhawan). A small ball inside the mouse, jutting out slightly from the bottom, is rolled on the work surface by the operator and therefore requires adequate frictional contact between the ball and the work surface. It should be noted that mice based on optical principles require a special pad or surface to operate upon, while mechanical mice contain moving parts that can gather dirt and dust while being used. Mice also contain at least one electrical switch which can be activated when a particular position is reached or can remain activated while one is moving the mouse over a surface.

Mitch, U.S. Pat. No. 4,520,355 teaches the use of a joystick which is basically a mechano-electric device with moving parts prone to wear and must be grasped by the hand and fingers for use. Its function is commonly accomplished through the use of internally mounted mechanical potentiometers capable of separating out the mutually orthogonal movements of the joystick. Usually mounted in some sort of package which would sit to the side of the main keyboard, it requires motion of the arm and wrist for access and operation.

The track ball as taught in U.S. Pat. No. 3,625,083 of Bose is another known device used for graphic interfacing. An "upside down" mouse contains a ball which juts out slightly above its top surface. Since it is usually set off to the side of the keyboard, one must move the hand over to it and use the fingers and wrist to manipulate the relatively large ball in the different orthogonal directions. This type of device is subject to airborne contamination.

Another device described as a finger actuated electronic control apparatus by Wedam, U.S. Pat. No. 4,654,647 also requires full attention of the hand in a location apart from the main keyboard while the device is manipulated by a finger. This device could almost be described as a track ball which has a limited range of movement. Mechanically complex, this device would be subject to wear, contamination and by nature be relatively expensive to manufacture.

Light pens are another class of graphic interface devices which are usually picked up and manipulated by the hand to point to a location directly on the computer CRT screen. Since these usually require whole arm movement, they can be very tiring to use for extended time periods. U.S. Pat. No. 4,565,999 by King, et al describes a wireless light pen which is aimed at a special purpose receiving unit while being manipulated by the head. The constant use of the neck muscles for very small precise movements of the head required to aim this light pen would fatigue the user if done for long periods of time. Power consumption and weight would be an issue since the light pen itself must be an active source of light and is wireless. This device would seemingly be expensive to manufacture due to its complex nature.

The next large and important class of graphic input devices are the X-Y digitizers or graphic tablets. In general, these devices use some electronic means of determining the location via X-Y coordinates of a stylus manipulated within the boundaries of some sort of tablet or surface. They are usually large devices (0.5-3 square feet and more), take up quite a bit of space and tend to be expensive. The high price of these devices prevents the great majority of computer users from purchasing them for general use. U.S. Pat. No. 3,904,822 by Kamm, et al teaches an absolute position determining system using a stylus which picks up signals from a conductive grid. In this case, the stylus requires electrical connection to the tablet and is therefore tethered to the tablet. If one were typing on a keyboard and desired to use this device, one would have to remove one's hand from the keyboard and grasp the stylus before data could be entered. Whetstone, et al were awarded U.S. Pat. No. 3,904,821 and teach a similar device based on a somewhat different magnetorestrictive electronic principle. This patent was for an improvement to the Brenner et al device U.S. Pat. No. 3,846,580 because of "certain manufacturing difficulties in providing an accurate positioned array of wires arranged in an x and y coordinate". These digitizers tend to be expensive because of possible manufacturing difficulties. This type of technology would also be difficult to implement in small enough size and weight to be effective for a finger worn device and would still require a tethered stylus. U.S. Pat. No. 4,654,648 to Herrington, et al describes a wireless cursor control system. This system requires a hand-held stylus which emits acoustic signals and a sensitive receiver which listens to the stylus and determines its position. Since the stylus is not connected to the system by a wire and emits acoustic energy, it needs an internal power source to operate and this power source will require occasional renewal. The need for a receiver with several sensitive microphones along with proper system calibrations in order to insure and maintain device accuracy will inevitably make this device expensive to manufacture.

Recently, commercially available computer programs have been enhanced to allow the use of graphic interface devices which make certain interactions with the program easier to learn and more efficient to do. However, these "graphic" enhancements have not eliminated the requirement that the computer operator must still use the standard keyboard to enter textual information since it is the most common way to do so. What occurs is an inefficient and tiring constant moving of the hand between keyboard and graphic input device. These devices can also tire the hand and wrist while they are being used. In addition to these operational disadvantages, these devices consume extra space on a desk which may be already crowded. The most popular of these devices are the X-Y digitizing tablet and the mouse. The instant invention is a cross between these two types of devices with a unique location and method of use.

It is very desirable to have an inexpensive device which eliminates the aforementioned disadvantages while enhancing the human-computer interface.

OBJECTS AND ADVANTAGES

The instant invention is directed to a small device, controlled by the thumb and index finger, worn on the index finger like a ring and small enough not be in the way while typing. Thus, one is able to keep one's hands on the keyboard while moving a cursor, making menu selections and typing. This invention is made possible by the novel combination of several factors which include microelectronics, new methods and techniques in the graphic arts and physiology. The first two will be discussed more in detail but a short comment about how physiology plays a part in this invention is in order. Physiologists have discovered that muscles of the body are "mapped" or represented in a very orderly fashion in certain areas of the brain. They have also found that not all body parts have the same amount of brain representing them. Specifically, the thumb has a very large area of brain devoted to it, an area 10 times greater than the area which controls the whole thigh, for example. This means, that the thumb and index finger together are capable of very fine control and movement, a fact important to this invention and its use.

Accordingly, objects and advantages of this invention are the following: to provide a miniaturized finger worn X-Y graphic interface device which allows an operator to achieve a faster, easier and less tiring means of entering data, and to provide a device which when used with a conventional computer keyboard will act synergistically to allow the computer-human interface to become more transparent, that is, faster, more natural, efficient and intuitive.

In addition the following objects and advantages exist: to provide a device which is inexpensive to manufacture, of small size and weight with few moving parts and a device that is very easy to learn to use.

Further objects and advantages of my invention will become apparent from a consideration of the drawings and ensuing description.

Figure 1:
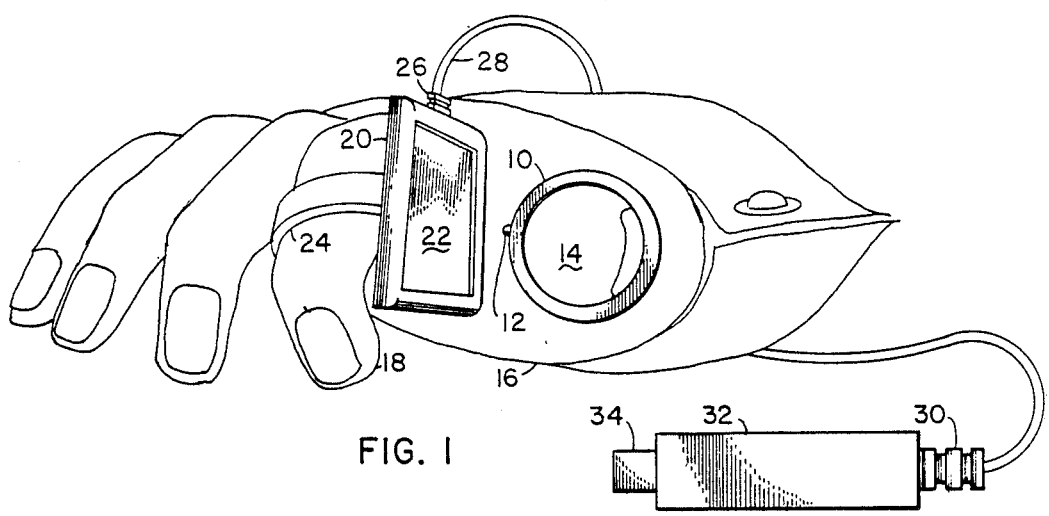
FIG. 1 shows a frontal view of the major component parts of this invention in place on the hand.

LIST OF REFERENCE NUMERALS 10 stylus ring
12 stylus ring point
14 right thumb
16 right hand
18 right index finger
20 finger palette
22 finger palette sensing element
22a electrical termination points
22b sensing element first layer
22c sensing element second layer
22d sensing element third layer
22e sensing element fourth layer
22f sensing element fifth layer
24 finger palette ring
26 finger palette/interface cable strain relief
28 coiled interface cable
28a interface cable wires
30 interface cable/electronic module strain relief
32 electronic module
34 computer interface plug
36 left hand
38 computer keyboard
40 finger palette top frame cover
40a upper strain relief retainer slot
40b beveled edge
42 finger palette bottom plate
42a lower strain relief retainer slot

DESCRIPTION OF INVENTION

FIG. 1 generally shows an overall view of the instant invention as it would be seen when worn on the right hand 16 which includes a right index finger 18 and right thumb 14. Stylus ring 10 is worn on the thumb 14. A stylus ring point 12, a radially extending protuberance, is carried on an annular outer surface of stylus ring 10. Right index finger 18 supports a finger "palette" 20. The palette 20 includes a ring 24. A finger palette sensing element 22 on finger palette 20 is visible opposite from the stylus ring point 12. The finger palette ring 24 connects to finger palette bottom plate 42 and is worn on right index finger 18. Attached to one side of the finger palette 20 is a finger palette/interface cable strain relief 26 which has connected on an opposed side a coiled interface cable 28. The coiled interface cable 28 terminates at an interface cable/electronic module strain relief 30. At the opposite end of the electronic module 32 is a computer interface plug 34.

Figure 2:
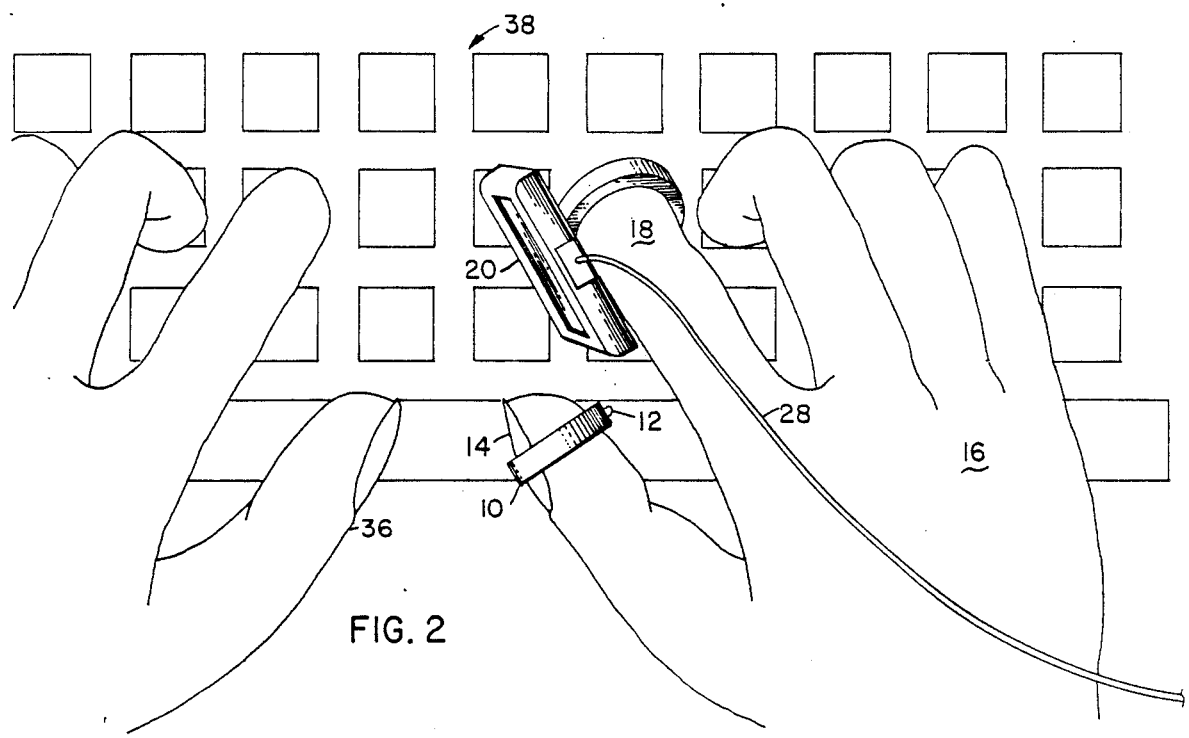
FIG. 2 shows the invention, again in place on the hand, in reference to actual use with a common type keyboard.

FIG. 2 shows a view of the invention as described in FIG. 1 but includes a view of the left hand 36 and right hand 16 in place on computer keyboard 38 as they would appear during use. One can observe the stylus ring 10 on the right thumb 14 and the finger palette 20 on the right index finger 18. The coiled interface cable 28 is attached to the finger palette 20 but the connection of the coiled interface cable 28 to the electronic module 32 is not shown in this figure.

Figure 3:
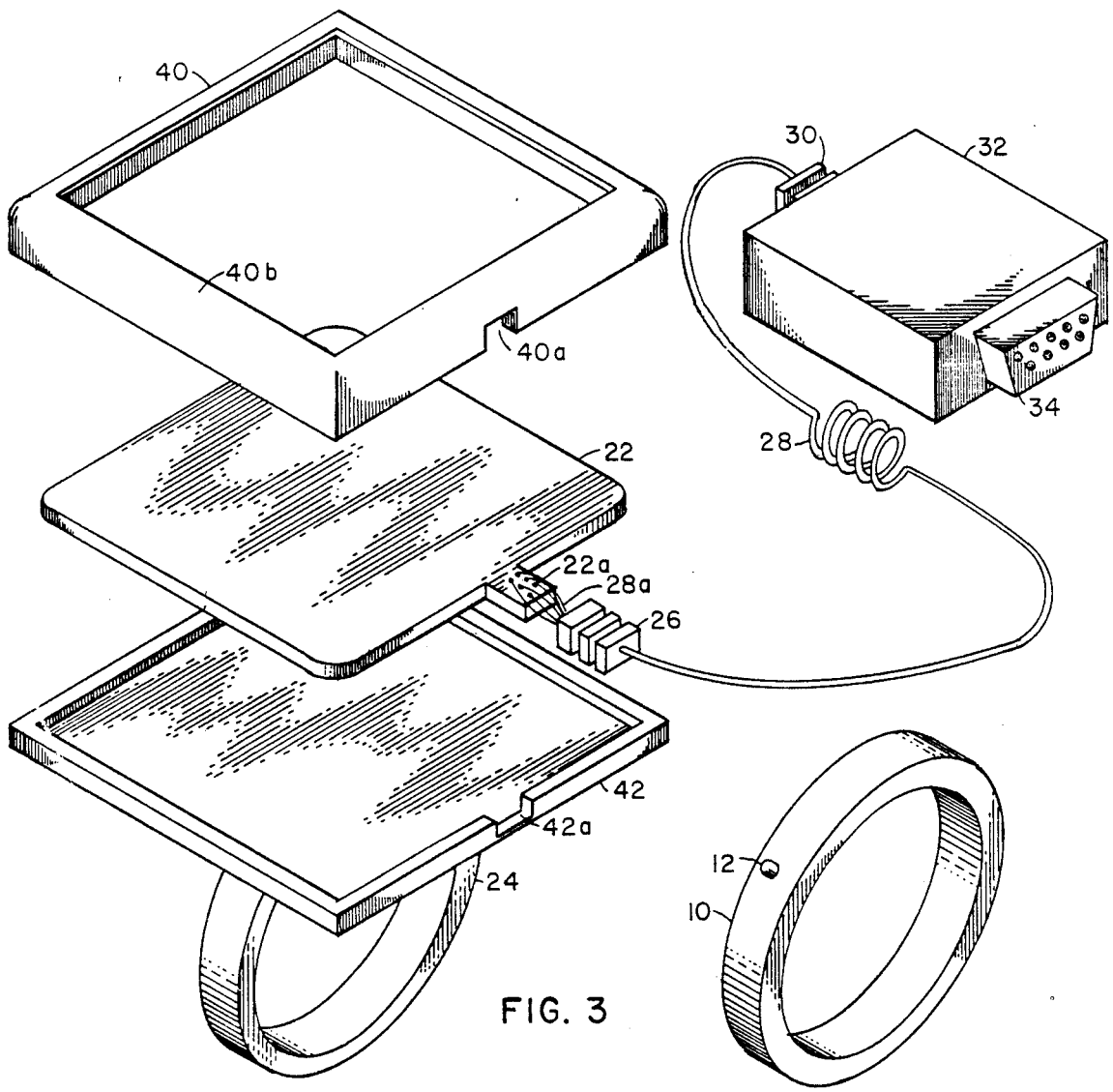
FIG. 3 shows an exploded perspective view of the major component parts of the invention.

FIG. 3 shows a perspective view of all major components of the invention with an exploded view of the finger palette 20. Another view of the stylus ring 10 with integral stylus ring point 12 is presented. The finger palette 20 consists of 3 major components: the finger palette top frame cover 40 with beveled edge 40b and upper strain relief retainer slot 40a, the finger palette sensing element 22 with electrical termination points 22a, and a finger palette bottom plate 42 with a lower strain relief retainer slot 42a. The finger palette sensing element 22 is sandwiched between and encased by the finger palette top frame cover 40 and the finger palette bottom plate 42 which snap together. The finger palette ring 24 is attached to the underside of the finger palette bottom plate 42. The electrical termination points 22a couple to interface cable wires 28a contained in the coiled interface cable 28. The interface cable wires 28a make electrical contact with the electrical termination points 22a upon assembly. The coiled interface cable 28 is attached to points 22a by the finger palette/interface cable strain relief 26 which in turn is held by the upper and lower strain relief retainer slots 40a & 42a.

Figure 4:
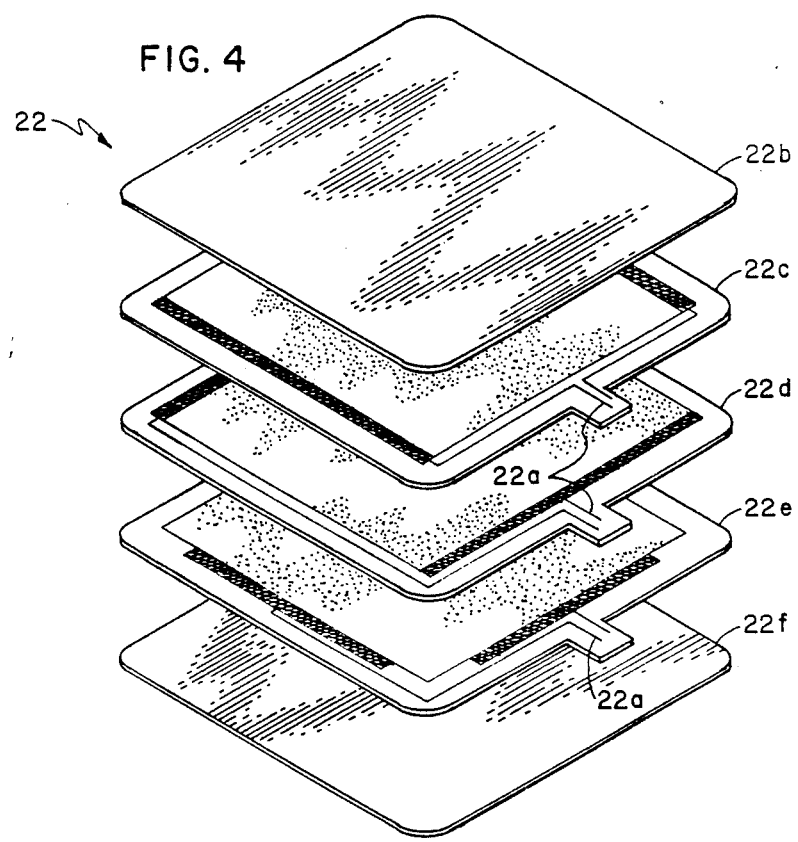
FIG. 4 shows a detailed exploded view of a sensing element shown in FIG. 3.

FIG. 4 details the finger palette sensing element 22. It should be noted that this component is preferably produced as an integrated single unit with modern graphic art and membrane switch technologies. SPECTRA SYMBOL of Salt Lake City, Utah, INTERLINK ELECTRONICS of Santa Barbara, Calif., THE HALL COMPANY of Urbana, Ohio or KOALA TECHNOLOGIES of Santa Clara, Calif. all appear to have the requisite skill to make this element 22. Finger palette sensing element 22 is shown as a 5 layer composition, although different methods of manufacture may contain more or less layers and different means of accomplishing the desired characteristics. The sensing element first layer 22b is a protective surface designed to protect the finger palette sensing element 22 from wear from the stylus ring point 12 as well as any other external contamination. The sensing element second layer 22c is designed to electrically detect position in the X direction. The sensing element third layer 22d is designed to electrically detect position in the Y direction. The sensing element fourth layer 22e is an electrical membrane type switch with or without tactile feedback which activates upon applied pressure. Finally, the sensing element fifth layer 22f is a rigid layer used for mounting and support of the upper 4 layers.

OPERATION OF INVENTION

The function of the various parts of the invention shall be described in this section. The description shall refer most often to a right handed user and the invention would therefore be worn on the right hand 16 but the operation would apply equally if worn on a user's left hand.

The stylus ring 10 shall be positioned on the right thumb 14 according to user preference with the following function in mind. The stylus ring point 12 shall face toward the right index finger 18 when the right hand 16 is in a slightly flexed position in order that the stylus ring point 12 can be pressed in a perpendicular manner against the finger palette sensing element 22 of the finger palette 20 worn on the right index finger 18. The small size of the stylus ring point 12 allows only a small area of the finger palette sensing element 22 to be contacted at any one time thus giving a high resolution. The finger palette 20 shall be positioned according to user preference on the right index finger 18 by means of the attached finger palette ring 24 with the following function in mind. It shall be placed so that it will oppose the stylus ring point 12 as described above and so that when the right hand 16 is sligthly flexed, the right thumb 14 and right index finger 18 can be mutually moved together so that the stylus ring point 12 can press against and circumscribe the entire finger palette sensing element 22. The finger palette top frame cover 40 with its beveled edge 40b acts as a portion of the enclosure for the finger palette sensing element 22 and is also designed to act as a guide for the stylus ring point 12 when it is moved around the perimeter of the finger palette sensing element 22. Therefore, the stylus ring point 12 and the beveled edge 40b are designed with each other in mind so that full function of the finger palette sensing element 22 will be realized at its outer perimeter. The finger palette bottom plate 42 is a portion of the enclosure which holds the finger palette sensing element 22 and has the finger palette ring 24 attached to its underneath surface. The finger palette top frame cover 40 and the finger palette bottom plate 42 together act as a clamp to hold the finger palette/interface cable strain relief 26 which fits into the upper strain relief retainer slot 40a and the lower strain relief retainer slot 42a. The finger palette/interface cable strain relief 26 anchors the coiled interface cable 28 to the finger palette 20 and absorbs the stress between these two parts if the coiled interface cable 28 is pulled upon. The coiled interface cable 28 contains a sufficient number of conductive wires which are electrically connected to the electrical termination points 22a of the finger palette sensing element 22 and transmits the required electrical signals between the finger palette sensing element 22 and the electronic module 32. The coiled nature of the coiled interface cable 28 acts to keep the cable short when it is not being pulled upon, and allows the user freedom of movement within the limits of the maximum stretched length of the cable as well as making the user physically aware that the maximum cable length is being approached. The coiled interface cable 28 is connected to the electronic module 32 through the interface cable/electronic module strain relief 30 which anchors the coiled interface cable 28 to the electronic module 32 and absorbs the stress between these two parts if the coiled interface cable 28 is pulled upon.

The functions of the various layers of the finger palette sensing element 22 shown in FIG. 4 benefit from more explanation. The sensing element first layer 22b is the portion of the finger palette sensing element 22 that is exposed to the environment. It serves a protective function and is made of a material, possibly plastic, that is flexible and would resist continued contact from the stylus ring point 12 as the stylus ring point 12 is either moved across its surface tracing out an arc comprised of mutually orthogonal X and Y coordinates or pressed down to activate the pressure activated switch. The next layer down, the sensing element second layer 22c functions as a linear potentiometer in the X direction. When the stylus ring point 12 is pressed against the finger palette sensing element 22 with enough pressure, an electrical signal proportional to the X coordinate can be read by the electronic module 32. Likewise, the sensing element third layer 22d functions as a linear potentiometer in the Y direction. When the stylus ring point 12 is pressed against the finger palette sensing element 22 with enough pressure, an electrical signal proportional to the Y coordinate can be read by the electronic module 32. The sensing element fourth layer 22e functions as a pressure activated switch with or without tactile feedback. When the stylus ring point 12 is pressed against the finger palette sensing element 22 with enough pressure, a switch closure is signaled to the electronic module 32. Note that the pressure required to generate a switch closure from the sensing element fourth layer 22e is greater than the pressure required to elicit the electrical signal from either the sensing element second layer 22c or the sensing element third layer 22d. The difference in these required activation pressures allows X and Y coordinates to be generated without generating a switch closure if so desired. This allows the invention to directly emulate the function of a one button mouse as found on the APPLE MACINTOSH computer. Finally, the sensing element fifth layer 22f serves as a structural support for the four layers above it. The finger palette sensing element 22 is merely illustrated as a 5 layer assembly basically to make it easier to describe. All of its required functions could be implemented with a different number of layers and the order of function might also be different than that which has been described.

The electronic module 32 contains electronic circuitry implemented either with or without a microprocessor and performs the function of obtaining the electrical information from the finger palette 20 while the device is in use and presents it to the computer in a form the computer can use. The computer interface plug 34 plugs into the computer and acts as the electrical connection between the invention and the computer. The instant invention could communicate with a computer in a number of ways. One way would be to place all the required circuitry in the electronic module 32 and communicate through an RS-232 type serial interface usually supplied with the computer. Another way would be to supply a special electronic board which must be inserted into the computer bus, into which the electronic module 32 would plug. This method usually requires less circuitry within the electronic module 32 or will entirely eliminate the need for the electronic module 32 and allows for faster information exchange at the expense of an additional circuit board. For example, the LOGITECH (TM) Mouse is available in these two forms.

Along with the hardware described above, there is a need for software. When the instant invention is plugged into a computer for example, that computer requires a "driver" program that works along with its operating system to take the information from the instant invention device, and process it in order to attain the end result of cursor movements on a screen. Also, if the electronic module 32 itself is implemented with a microprocessor, there will be software associated with it. Basically, the circuitry in the electronic module 32 must measure the analog electrical signals coming from the various layers of the finger palette sensing element 22 and convert them to a digital form which can be used by the computer. This can be done thousands of times per second and averaged to give results that are very steady and reliable. Also, additional functions of the pressure activated switch can be obtained by pressing an alternative function key on the keyboard such as "Ctrl" or "Alt" while simultaneously enabling the pressure activated switch.

Some of the software functions that could be programmed according to the user's preference are as follows. The nature of the finger palette sensing element 22 allows absolute X-Y coordinates to be obtained. Software would allow this absolute mode to be used or could change this to a relative mode. In the absolute mode, when contact is first made by the stylus ring point 12 upon the finger palette sensing element 22, the cursor would jump to that position on the screen, then as the stylus ring point 12 is slid across the finger palette sensing element 22, the cursor would smoothly follow. In the relative mode, when contact is first made by the stylus ring point 12 upon the finger palette sensing element 22, the cursor would remain where it was from the last time until the stylus ring point 12 is slid across the finger palette sensing element 22 and then the cursor would move. Either of these modes might be more advantageous at different times and could be alternated as desired during use. In the relative mode one could program how far the screen cursor will move relative to the movement of stylus ring point 12 on the finger palette sensing element 22. This would allow finer or coarser control of movement. Another example of user programming would allow one to set the positive and negative directions of the X and Y coordinates. This would be useful for a left handed user to flip the positive and negative direction conventions of the X and Y coordinate lines to allow the coiled interface cable 28 to exit the finger palette 20 towards the wrist and remain out of the way. Many of the operating parameters of this device could be custom tailored to the preference of the user.

CONCLUSION AND SCOPE OF INVENTION

A novel miniaturized X-Y graphic interface device has been presented. This device differs from conventional devices because inter alia, it is worn like a ring on the index finger with a stylus ring on the thumb. This allows the X-Y coordinates to be traced on the palette by the thumb and index finger with their fine mutual motor control. An underlying pressure activated switch can be triggered upon increasing pressure once a desired X-Y coordinate position is reached. An unexpected result of this arrangement is that the hands can remain on the keyboard at all times, increasing the efficiency of the human-computer interface.

The previous discussion often referred to computers as an example of a device which requires or can benefit from this invention, but it is not intended to imply that computers are the only devices which will benefit. For example, selected axes of a robotic arm could be controlled by this invention. Also, the above description, although specific, is only an example of a preferred embodiment. There are possible variations. To mention but a few for example, the finger palette 20 is shown to be square but could be made rectangular to be more in accordance with the general shape of a computer CRT monitor screen. Also there are a large number of ways for the coiled interface cable 28 to connect to the electrical termination points 22a. These might be soldered or press connected, for example. The finger palette ring 24 as well as the stylus ring 10 could be adjustable elastic band type elements. There could be a swivel joint placed at the junction where the finger palette bottom plate 42 and the finger palette ring 24 are joined to facilitate optimal orientation on a particular user's hand. The protective sensing element first layer 22b might be printed with a grid or other graphic to aid the user in cursor placement. Accordingly, the appended claims and their legal equivalents should determine the scope of the invention and not the illustrated embodiments.

I claim:

1. A computer graphic interface which provides a user efficient access to both a computer keyboard and a graphic input means, comprising in combination:
    a stylus worn on one finger of the user,
    an input palette worn on another finger of the user,
        said palette includes sensing means to detect locational presence of said stylus on said palette, and
        said sensing means operatively coupled to said computer whereby the user can manipulate said stylus and said palette while both hands of the user address the computer keyboard for speed and efficiency.

2. The interface device of claim 1 wherein said stylus is formed from an arcuate strip of material which circumscribes at least a portion of the user's finger and is retained thereby, and a protuberance projecting from an outer surface of said stylus arcuate material strip radially from the finger.

3. The interface device of claim 2 wherein said palette is formed from an arcuate strip of material which circumscribes at least a portion of another finger of the user, a palette bottom plate having a lower surface fastened to said palette arcuate material strip and an upper surface supporting said sensing means, and a palette top cover overlying said sensing means and fastened to said bottom plate.

4. The interface device of claim 3 wherein said top cover and said bottom plate are fastened by a lip downwardly extending from a periphery of said top cover, an upwardly extending lip emanating from said bottom plate, and a slot is provided in both said lips to provide strain relief for a cable passing therethrough and coupled to said sensing means.

5. The interface device of claim 4 wherein said sensing means is formed as layers of sensors, each said sensor layer differently sensitive to stimulus imparted by said stylus so that each said sensor communicates different information to the computer through said cable for subsequent processing.

6. The interface device of claim 5 wherein a first said layer transmits information of an "X" direction of a coordinate system, a second said layer transmits information of a "Y" direction of the coordinate system, and a third said layer transmits information with respect to a stylus pressure.

7. The interface device of claim 6 wherein a top said layer is formed from a membrane which transmits stylus pressure and protects lower said layers from contamination.

8. An interface device for facilitating multi-dimensional input from an operator to a processing receiver, comprising in combination:

a stylus means embodied as a protuberance carried on one finger of the operator, and a palette, including means for sensing position information, having a surface for contact with said protuberance and carried on another finger of the operator, said surface operatively coupled to the processing receiver to transmit said position information derived by contact between said stylus and said palette.

9. The interface device of claim 8 wherein said stylus is formed from an arcuate strip of material which circumscribes at least a portion of the user's finger and is retained thereby, and a protuberance projecting from an outer surface of said stylus arcuate material strip radially from the finger.

10. The interface device of claim 9 wherein said palette is formed from an arcuate strip of material which circumscribes at least a portion of another finger of the user, a palette bottom plate having a lower surface fastened to said palette arcuate material strip and an upper surface supporting said sensing means, and a palette top cover overlying said sensing means and fastened to said bottom plate.

11. The interface device of claim 10 wherein said top cover and said bottom plate are fastened by a lip downwardly extending from a periphery of said top cover, an upwardly extending lip emanating from said bottom plate, and a slot is provided in both said lips to provide strain relief for a cable passing therethrough and coupled to said sensing means.

12. The interface device of claim 11 wherein said sensing means is formed as layers of sensors, each said sensor layer differently sensitive to stimulus imparted by said stylus so that each said sensor communicates different information to the processing receiver through said cable for subsequent processing.

13. The interface device of claim 12 wherein a first said layer transmits information of an "X" direction of a coordinate system, a second said layer transmits information of a "Y" direction of the coordinate system, and a third said layer transmits information with respect to a stylus pressure.

14. The interface device of claim 13 wherein a top said layer is formed from a membrane which transmits stylus pressure and protects lower said layers from contamination.

15. A finger operated X-Y graphic interface device comprising:

a sensing element with two dimensional X-Y position sensing and pressure sensing whereby electrical signals are produced indicating absolute X-Y position coordinates and pressure when activated, a housing for containing, supporting and protecting said sensing element whereby said sensing element is mounted in said housing, said housing being of small enough size and weight whereby said housing can be worn comfortably on a hand for long periods of time, an attaching means for said housing whereby said housing can be attached to a finger such as the index finger, an activating stylus for said sensing element, said activating stylus containing a nub of proper construction whereby said nub when pressed against said sensing element will elicit said electrical signals from said sensing element, a mounting means for said stylus whereby said stylus may be mounted on a finger such as the thumb, said sensing element having means to sense said absolute position in each said dimension when activated by said activating stylus, said sensing element having means to sense pressure whereby said pressure is greater than that required to sense said absolute position in said two dimensions.

16. A method for information transfer to a receiver the steps including:

wearing a digitizing means on one finger, wearing a stylus means on another finger, coupling the digitizing means to a receiver, and activating said digitizing means with said stylus means, thereby effectuating locational information transferred to the receiver.

17. A method for inputting position information to a receiver utilized in a system which includes:

a tablet having a sensor for sensing position information designed to be worn on one finger, a stylus designed to be worn on another finger, and a receiver comprising the steps of:

manipulating the stylus on the tablet,
sensing the position of the stylus on the tablet,
and transmitting the sensed position to the receiver.

18. A method for information transfer to a receiver, said information obtained by manipulating two mutually opposable portions of a hand, the steps including:
    attaching a digitizer to one opposable portion of the hand,
    attaching a stylus to the other opposable portion of the hand,
    coupling the digitizer to a receiver,
    and contacting the digitizer with the stylus thereby effectuating information transferral to the receiver.

19. A hand operated X-Y graphic interface device comprising:
    a sensing element with two dimensional X-Y position sensing and pressure sensing whereby electrical signals are produced indicating absolute X-Y position coordinates and pressure when activated,
    a housing for containing, supporting and protecting said sensing element whereby said sensing element is mounted in said housing,
    said housing being of small enough size and weight whereby said housing can be worn comfortably on one mutually opposable portion of a hand for long periods of time,
    an attaching means for said housing whereby said housing can be attached to said opposable portion of the hand,
    an activating stylus for said sensing element,
    said activating stylus containing a nub of proper construction whereby said nub when pressed against said sensing element will elicit said electrical signals from said sensing element,
    a mounting means for said stylus whereby said stylus may be mounted to another mutually opposable portion of the hand,
    said sensing element having means to sense said absolute position in each said dimension when activated by said activating stylus,
    said sensing element having means to sense pressure whereby said pressure is greater than that required to sense said absolute position in said two dimensions.

* * * * *